United States Patent [19]

Cross et al.

[11] 4,261,300

[45] Apr. 14, 1981

[54] NUCLEAR STEAM GENERATOR

[75] Inventors: Michael T. Cross, Vernon; Ronald Keklak, Amston; Cris A. Worley, Bloomfield, all of Conn.

[73] Assignee: Combustion Engineering, Inc., Windsor, Conn.

[21] Appl. No.: 973,064

[22] Filed: Dec. 26, 1978

[51] Int. Cl.³ .................. F22B 37/48; F28G 9/00
[52] U.S. Cl. ...................... 122/388; 122/32; 122/379; 122/406 R
[58] Field of Search ............... 122/32, 34, 406 R, 483, 122/379, 381, 382, 388

[56] References Cited

U.S. PATENT DOCUMENTS

| 394,137 | 12/1888 | Roitan | 122/397 |
| 2,989,037 | 6/1961 | Filippino et al. | 122/379 |
| 3,468,293 | 9/1969 | Bergstrona | 122/379 X |
| 3,900,010 | 8/1975 | Stiteler | 122/32 |
| 3,916,844 | 11/1975 | Cassell | 122/32 |

*Primary Examiner*—Edward G. Favors
*Attorney, Agent, or Firm*—Edward L. Kochey, Jr.

[57] ABSTRACT

A nuclear steam generator has a blowdown pump arranged to pump water from the blowdown lines through a filter for return to the steam generator. The piping is arranged so that the same pump may operate to reverse the direction of pumping through the blowdown line, whereby reverse circulation may be established during wet lay up of the steam generator. A blower is arranged to withdraw nitrogen from an upper elevation in the steam generator and injected into the blowdown line in combination with the pumped reverse circulation during wet lay up.

7 Claims, 1 Drawing Figure

U.S. Patent
Apr. 14, 1981
4,261,300
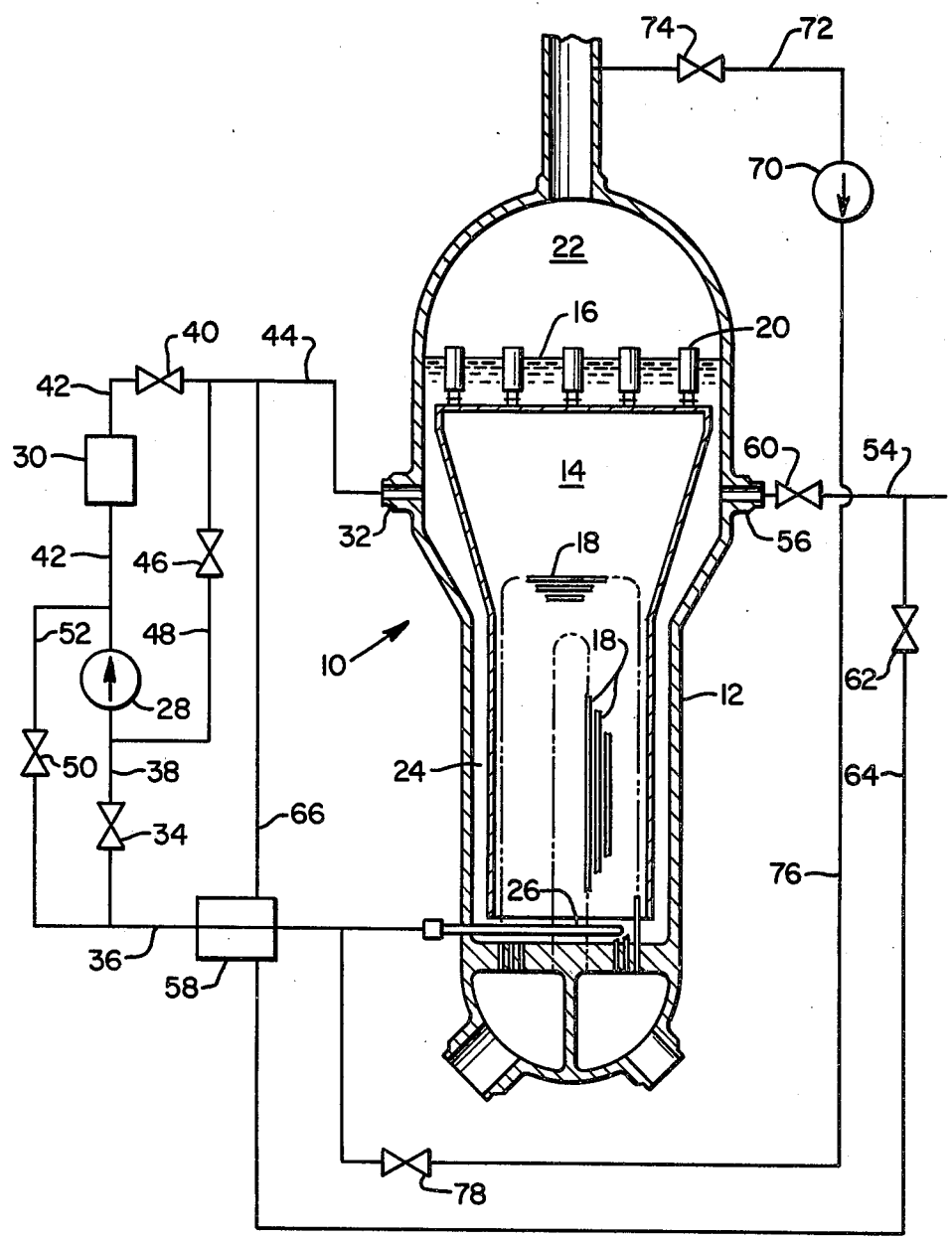

NUCLEAR STEAM GENERATOR

BACKGROUND OF THE INVENTION

This invention relates to nuclear steam generators and in particular to an apparatus for effectively circulating water during wet lay up of the steam generator.

Suspended solids develop within steam generators due to corrosion products from within the steam generator and solids which are carried in along with the feed water. These suspended solids are removed by blowing down a portion of the water through a blowdown line which is normally located in the lower portion of the steam generator in an area of low velocity. The removal of water from the steam generator represents a heat loss which may be avoided by pumping this water through a filter and returning it to the steam generator. The solids are removed in the filter. Such a pump need be designed only for up to approximately 5 percent of the steam generating capacity of the unit.

During wet lay up of a steam generator, the unit must be protected from corrosion. Chemicals which are added to provide such protection are subject to stratification with resulting incomplete protection. It is desirable to have a method for effectively mixing and distributing the chemicals during the wet lay up period.

SUMMARY OF THE INVENTION

A nuclear steam generator has a blowdown system along with a blowdown recirculating pump and a filter for clean up of the steam generator during normal operation. This same pump may be used to obtain reverse circulation through blowdown system to the steam generator during wet lay up periods to obtain internal circulation within the steam generator.

During the lay up period the flow may be periodically returned to the flow path thru the filter. This provides for removal of accumulated suspended solids, and the change of flow path within the steam generator will re-entrain some of the deposited solids.

A blower is added which withdraws nitrogen from the nitrogen blanket used during wet lay up and injects it into the blowdown line in conjunction with the recirculated water. This nitrogen bubbling through the water together with the recirculated flow agitates the mixture and improves distribution of the recirculated water thereby avoiding laning and bypassing of portions of the steam generator.

BRIEF DESCRIPTION OF THE DRAWINGS

The FIGURE is a schematic illustration of the arrangement of the components of the invention.

DESCRIPTION OF THE PREFERRED EMBODIMENT

A nuclear steam generator 10 includes a vessel 12 which contains the water to be evaporated 14. This water has a water level 16 which is generally in an upper elevation of the vessel. A heating tube bundle 18 is supplied with hot water from the reactor and is immersed in the water 14 within the vessel 12. During normal operation, steam is generated in the central portion of the steam generator and passes upwardly through steam separators 20 to steam space 22. The portion of the water not evaporated recirculates downwardly through annular space 24.

At lower elevation with the steam generator blowdown line 26 is located. This generally consists of a perforated pipe at a location where the highest potential for suspended solids drop out would be expected.

A blowdown pump 28 in conjunction with filter 30 is arranged so that blowdown fluid may be pumped through the filter for cleanup and then returned at an upper elevation through nozzle 32. A first valve 34 is located in the suction line and is connected to the blowdown line 26 by conduit 36, and the valve is connected to pump 28 by conduit 38. A second valve 40 is located on the discharge side of the pump and is connected to the pump by conduit 42 and to the nozzle 32 by conduit 44. The filter 30 is located in conduit 42 on the discharge side of the pump.

A third valve 46 is located in conduit 48 which is connected between conduits 38 and 44. A fourth valve 50 is located in conduit 52 which is connected between conduits 36 and 42.

This cleanup system is designed for up to 5 percent of the steam generator rated output and during normal operation valves 34 and 40 are open with valves 46 and 50 being closed. The flow is, therefore, pumped from the blowdown line 26 through the filter 30 returning through nozzle 32 to the steam generator.

Normally feed water will pass from feed line 54 in through feed water nozzle 56. In order to improve the NPSH available to the blowdown pump, a heat exchanger 58 may be located in the blowdown recirculating line. Water is supplied through this heat exchanger by throttling valve 60 and opening valve 62 located in line 64 which thereby conveys water from the feed water line 54 to the heat exchanger 58. The feed water then may pass from this heat exchanger 58 to the steam generator through line 66 which is connected to conduit 44, thereby providing NPSH without a mass or heat energy loss.

During wet lay up of the steam generator, it is desirable to obtain some circulation to keep the chemicals mixed within the steam generator. This same 5 percent flow may be recirculated by closing valves 40 and 34 while opening valves 46 and 50. Flow then passes out through nozzle 32 and into the steam generator through the blowdown line 26.

Such operation of the blowdown pump is effective to obtain some circulation through the steam generator and the concomitant mixing of chemicals. Since the normal flow through the steam generator due to its internal recirculation is about 5 times the rated steam generating capacity of the unit, it can be seen that the 5 percent flow represents only approximately 1 percent of the normal flow rate through the steam generator itself. At such a low flow rate, there may be some problems with laning of the recirculated flow and bypass of some portions within the steam generator, thereby permitting incomplete mixing at these locations.

During wet lay up, the steam volume 22 will normally contain nitrogen under a protective nitrogen blanket. A nitrogen blower 70 is arranged to take its suction through conduit 72 containing valve 74 from the upper nitrogen space 22. The discharge from the blower 70 passes through conduit 76 containing valve 78 to conduct 36 from which it passes into the continuous blowdown line 26. This forced recirculation of nitrogen mixes with the water which is passing through the continuous blowdown line 26 providing significantly increased velocity and agitation, thereby improving the mixing of the chemicals within the steam generator.

Periodically during wet lay up the nitrogen recirculation is stopped and the water flow path returned to the direction through the filter. This may be accomplished by opening valve 34 providing a recirculating circuit through the pump. Valve 40 may then be opened and valve 46 closed. Thereafter valve 50 is closed and the flow path is established from blowdown line 26 through filter 30 returning through flow nozzle 32.

Any corrosion products which have been built-up during the lay up period and which are in suspension because of the earlier-described operation will be circulated through the filter and removed. The flow reversal will also change local flow paths within the steam generator and re-entrain some of the settled solids, thereby increasing the effectiveness of the solids removal operation. Separation of the gas introduction and water withdrawal which are illustrated as both occurring in blowdown line 26 would permit continued introduction of gas while the water flow is being filtered.

What is claimed is:

1. A nuclear steam generator having an outer vessel surrounding the water to be evaporated, the water having a natural water level; a heating tube bundle located within said vessel below the water level; a blowdown line located within said vessel and substantially below the water level at a low elevation; a blowdown pump; a first valve; a first conduit connecting said blowdown line to said first valve; a second conduit connecting said first valve to said blowndown pump; a second valve; a third conduit connecting said blowdown pump to said second valve; a fourth conduit connecting said second valve to said vessel at a first upper elevation; a third valve; a fifth conduit containing said third valve connecting said second and fourth conduits; a fourth valve; a sixth conduit connecting said first and third conduits and containing said fourth valve; a blowdown filter located in one of said first, second, third, or fourth conduits.

2. A steam generator as in claim 1 wherein said filter is located in one of said third or fourth conduits.

3. A steam generator as in one of claims 1 or 2: having also a blower; a seventh conduit connecting said steam generator at a second upper elevation higher than said first upper elevation to said blower; and an eighth conduit connecting said blower to said first conduit.

4. A method of operating a nuclear steam generator during wet lay up, said steam generator having water therein to a predetermined level and an inert gas above the water level, comprising: withdrawing boiler water from said steam generator at an upper elevation; pumping the withdrawn water into said steam generator at a lower elevation; simultaneously withdrawing an inert gas from said steam generator at an elevation above the water level therein and injecting the gas into the water at a lower elevation.

5. A method as in claim 4 including also: periodically passing water withdrawn from said steam generator through a filter.

6. The method as in claim 5, wherein the step of passing water through a filter comprises: stopping withdrawal of boiler water from an upper elevation; stopping pumping the withdrawn water into said steam generator at a lower elevation; withdrawing the water from a lower elevation; passing the withdrawn water though a filter; and introducing the filtered water at an upper elevation.

7. The method as in claim 6, including also the steps of: stopping the withdrawing and injecting of gas while passing the water through the filter.

* * * * *